United States Patent Office 2,929,983
Patented Mar. 22, 1960

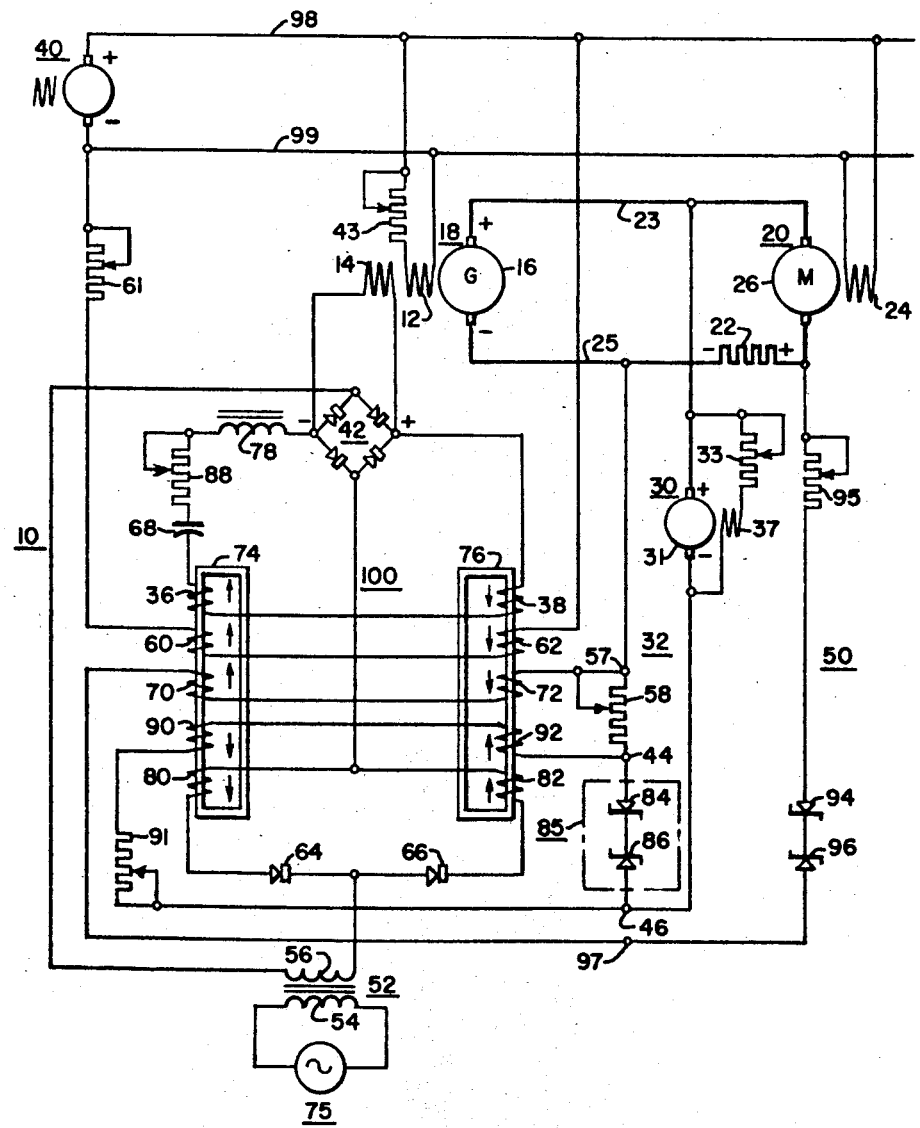
March 22, 1960  D. E. ABELL  2,929,983
CONTROL APPARATUS
Filed Aug. 12, 1957
WITNESSES:
Bernard R. Gieguey
Clement L. McHale
INVENTOR
Donald E. Abell
BY
F. E. Browder
ATTORNEY

2,929,983

CONTROL APPARATUS

Donald E. Abell, Buffalo, N.Y., assignor to Westinghouse Electric Corporation, East Pittsburgh, Pa., a corporation of Pennsylvania Application August 12, 1957, Serial No. 677,671

7 Claims. (Cl. 322—36)

This invention relates to electric control apparatus and more particularly to regulator systems.

When starting up a generator which supplies energy to a motor, it is oftentimes necessary to limit the output current of the generator in order to prevent damage to the motor. The reason for this is that if the generator voltage builds up too rapidly, the motor is unable to accelerate fast enough to handle this rapid increase in generator voltage and a flash over of the motor may result. Also, if the motor should stall during operation, then the regulator system associated with the generator may attempt to maintain the output voltage of the generator which would cause excessive current to flow in the motor and damage the motor. It is therefore desirable to provide a regulator system in which the operation of the regulator system is modified after the output current of the generator, with which the regulator system is associated, reaches a predetermined value in order to prevent the regulator system from attempting to maintain the output voltage of the generator and causing excessive current.

An object of this invention is to provide a new and improved regulator system for a dynamoelectric machine.

Another object of this invention is to provide for limiting the current output of a generator when a load is suddenly connected across the output terminals of the generator.

Another object of this invention is to provide a new and improved means of limiting the output current of a generator when a regulator system is attempting to maintain the output voltage of the generator.

Other objects of the invention will in part be obvious and will in part appear hereinafter.

For a fuller understanding of the nature and objects of the invention, reference should be had to the following detailed description taken in connection with the accompanying drawing, in which the single figure is a schematic diagram illustrating this invention.

Referring to the drawing, this invention is illustrated by reference to a regulator system 10 for maintaining the output voltage of a direct current generator 18 at substantially a predetermined value. In this instance, the generator 18 comprises an armature 16, a differential field winding 12 and a main shunt field winding 14. The function of the differential field winding 12 is to buck-out the residual magnetism of the generator 18 and for other possible use in connection with controlling the speed of the motor 20. As illustrated, the differential field winding 12 is connected to be energized from the conductors 98 and 99 which have applied thereto a substantially constant direct current voltage from the direct current source 40. An adjustable resistor 43 is connected in series circuit relationship with the differential field winding 12 so that the magnitude of the current flow through the differential field winding 12 can be varied.

A direct current motor 20 having an armature 26 and a field winding 24 is connected to be energized from the direct current generator 18. As illustrated, the field winding 24 of the direct current motor 20 is also connected to be energized from the conductors 98 and 99. Since the regulator system 10 maintains the output voltage of the direct current generator 18 at substantially a predetermined value, the speed of the direct current motor 20 is likewise maintained at substantially a predetermined value.

In general, the regulator system 10 comprises a reference exciter 30 for producing a substantially constant direct current reference voltage, circuit means 32 for obtaining a direct current error voltage which is a measure of the difference between the reference voltage and the output voltage of the generator 18, a magnetic amplifier 100 which is responsive to the error voltage and which is connected to control the magnitude of the voltage across the main shunt field winding 14 of the generator 18, circuit means 85 for limiting the error voltage applied to the magnetic amplifier 100 and circuit means 50 for preventing the regulator system 10 from maintaining the output voltage of the generator 18 at its regulated value after the output current of the generator 18 reaches a predetermined value.

Specifically the reference exciter 30 for producing a direct current reference voltage comprises a direct current exciter having an armature 31, a field winding 37 and a variable resistor 33 for adjusting the magnitude of the current flow through the field winding 37 and thus the magnitude of the direct current output voltage of the direct current exciter 30. However, it is to be understood that any suitable source of reference voltage having a substantially constant direct current output voltage could be substituted for the direct current exciter 30 illustrated.

The circuit means 32 for obtaining a direct current error voltage which is a measure of the difference between the reference voltage and the output voltage of the generator 18 includes the adjustable resistor 58 and the reference exciter 30 connected in series circuit relationship across the output of the generator 18 at the conductors 23 and 25. The reference exciter 30 is connected so that the output voltage of the reference exciter 30 opposes the output voltage of the generator 18. The net error voltage which is the difference between the output voltage of the generator 18 and the output voltage of the reference exciter 30 therefore appears at the output terminals 44 and 46 of the circuit means 32. The adjustable resistor 58 is provided in order to vary the current which flows through whatever load is connected at the terminals 44 and 46 of the circuit means 32.

In this instance, the magnetic amplifier 100 is a full-wave, doubler type, self-saturating magnetic amplifier. The magnetic amplifier 100 comprises two magnetic core members 74 and 76 which have disposed in inductive relationship therewith load windings 80 and 82 respectively. In order to produce self-saturation for the magnetic amplifier 100, the self-saturating rectifiers 64 and 66 are connected in series circuit relationship with the load windings 80 and 82 respectively. Energy for the load windings 80 and 82 is received from the secondary winding 56 of the transformer 52. The primary winding 54 of the transformer 52 has applied thereto a suitable alternating current voltage from the alternating current voltage source 75. A full-wave dry type rectifier 42 is so interconnected with the load windings 80 and 82 and with the secondary winding 56 of the transformer 52 as to produce at its output a direct current voltage which represents the output voltage of the magnetic amplifier 100. The main shunt field winding 14 of the generator 18 is connected across the output of the rectifier 42.

The bias windings 60 and 62 are disposed in inductive relationship with the magnetic core members 74 and 76 respectively. The bias windings 60 and 62 are connected in series circuit relationship with one another and in series circuit relationship with an adjustable resistor 61, the series circuit being connected between the conductors 98 and 99. The function of the adjustable resistor 61 is to allow the magnitude of the current flow through the bias windings 60 and 62 to be varied. In operation, the current flow through the bias windings 60 and 62 produces magnetomotive forces that oppose the magnetomotive forces produced by the current flow through the load windings 80 and 82, respectively. Thus the bias windings 60 and 62 function to bias the magnetic core members 74 and 76 respectively, a predetermined amount away from saturation.

In order to control the output voltage of the magnetic amplifier 100 in accordance with the magnitude of the direct current error voltage obtained from the circuit means 32, the control windings 90 and 92 are disposed in inductive relationship with the magnetic core members 74 and 76, respectively. In this instance, the control windings 90 and 92 are connected in series circuit relationship with one another and in series circuit relationship with the adjustable resistor 91, the series circuit being connected across the output terminals 44 and 46 of the circuit means 32.

The damping windings 36 and 38 are disposed in inductive relationship with the magnetic core members 74 and 76, respectively. The damping windings 36 and 38 are connected in series circuit relationship with one another and in series circuit relationship with the reactor 78, the adjustable resistor 88 and the capacitor 68, the series circuit being connected across the output of the rectifier 42 in parallel circuit relationship with the main shunt field winding 14 of the generator 18. The adjustable resistor 88 and the capacitor 68 comprise a conventional feedback circuit in which the damping windings are responsive to changes in the output voltage of the magnetic amplifier 100. The reactor 78 is provided in order to filter out undesired frequencies which might interfere with the operation of the magnetic amplifier 100. In operation, the current flow through the damping windings 36 and 38 produces magnetomotive forces that oppose the magnetomotive forces produced by the current flow through the control windings 90 and 92, respectively. Thus, the current flow through the damping windings 36 and 38 is in the nature of a negative feedback signal which functions to stabilize the operation of the regulator system 10.

The current limit windings 70 and 72 are disposed in inductive relationship with the magnetic core members 74 and 76, respectively. The current limit windings 70 and 72 are connected in series circuit relationship with one another, the series circuit being connected across the output terminals 57 and 97 of the circuit means 50, the purpose of which will be explained hereinafter. In operation, the current flow through the current limit windings 70 and 72 produces magnetomotive forces that oppose the magnetomotive forces produced by the current flow through the control windings 90 and 92, respectively.

The circuit means 85 for limiting the magnitude of the direct current error voltage applied to the control windings 90 and 92 of the magnetic amplifier 100 comprises two semiconductor devices, specifically two semiconductor diodes, 84 and 86, preferably of the type known to the art as Zener diodes, connected in series circuit relationship so that each diode is connected to conduct current in a direction opposite to that of the other diode, the series circuit being connected across the output terminals 44 and 46 of the circuit means 32 and in parallel circuit relationship with the series circuit which comprises the control windings 90 and 92 and the adjustable resistor 91. In operation, when the magnitude of the direct current error voltage at the output terminals 44 and 46 of the circuit means 32 reaches a predetermined magnitude of either polarity, one of the semiconductor diodes 84 and 86 breaks down so as to effect a shunting of a portion of the error current signal produced by the direct current error voltage through the circuit means 85 while the error voltage is above the predetermined value. In summary, the circuit means 85 functions to limit the ampere turns of the control windings 90 and 92 to a maximum predetermined value regardless of the direct current error voltage at the terminals 44 and 46 of the circuit means 32.

The circuit means 50 which cooperates with the current limit windings 70 and 72 of the magnetic amplifier 100 to prevent the regulator system 10 from maintaining the output voltage of the generator 18 at its regulated value after the output current of the generator 18 reaches a predetermined value, comprises a resistor 22 which is connected in series circuit relationship with the output of the generator 18 between the conductor 25 and the armature of the motor 20, an adjustable resistor 95 and two semiconductor devices, specifically two semiconductor diodes 94 and 96. The adjustable resistor 95 and the semiconductor diodes 94 and 96 are connected in series circuit relationship with the current limit windings 70 and 72 of the magnetic amplifier 100, the series circuit being connected in parallel circuit relationship with the resistor 22. In operation, the resistor 22 is connected so as to obtain a voltage which is a measure of the output current of the generator 18. Since the semiconductor diodes 94 and 96 are connected so as to conduct current in opposite directions, no current flows in the current limit windings 70 and 72 from the output terminals 57 and 97 of the circuit means 50 until the voltage across the resistor 22 reaches a magnitude of either polarity equal to the breakdown voltage of one of the diodes 94 and 96, which are preferably of the type known to the art as Zener diodes.

The operation of the complete regulator system 10 will now be considered. When the output voltage of the generator 18 increases to a value above its regulated value, a direct current error voltage will appear at the output terminals 44 and 46 of the circuit means 32. The current flow through the control windings 90 and 92 thereby produces magnetomotive forces that oppose the magnetomotive forces produced by current flow in the load windings 80 and 82 respectively. The output voltage of the magnetic amplifier 100 will then decrease and the current flow to the main shunt field winding 14 of the generator 18 will also decrease to thereby return the output voltage of the generator 18 to its regulated value.

On the other hand, if the output voltage of the generator 18 decreases to a value below its regulated value, a direct current error voltage will appear at the output terminals 44 and 46 of the circuit means 32 of the opposite polarity to cause a current to flow in the control windings 90 and 92 to produce magnetomotive forces that aid the magnetomotive forces produced by the current flow through the load windings 80 and 82, respectively. Such an output increases the output voltage of the magnetic amplifier 100 across the output of the rectifier 42 to thereby increase the current flow through the main shunt field winding 14 of the generator 18 and increase the output voltage of the generator 18 to its regulated value.

The effect of the circuit means 50 on the operation of the regulator system 10 will now be considered. It is assumed that for some reason the output current being applied by the generator 18 to the motor 20 increases and that a direct current error voltage is present at the output terminals 44 and 46 which would cause the regulator system 10 to maintain the output voltage of the generator 18 at its regulated value in the absence of the circuit means 50. The operation of the regulator system 10 will change when the output current of the generator 18 increases and the voltage drop across the resistor 22 reaches a value equal to the breakdown voltage of one of the diodes 94 and 96. When the output current of the generator 18 reaches this excessive value, current will then flow through the adjustable resistor 95, the semiconductor diodes 94 and 96 and the current limit windings 70 and 72 back to the line conductor 25 at the output of the generator 18. The circuit means 50 and the current limit windings 70 and 72 will be designed so that the ampere turns of the current limit windings 70 and 72 will be substantially equal and opposite to the maximum ampere turns of the control windings 90 and 92 determined by the circuit means 85. The circuit means 85 is provided to cooperate with the circuit means 50 in order that the ampere turns of the control windings 90 and 92, which must be substantially balanced by the current limit windings 70 and 72 when the output current of the generator 18 reaches a predetermined value, will not be excessive.

It is to be understood that the circuit means 50 could be applied in connection with a regulator system having a magnetic amplifier with separate windings responsive to a reference voltage and to the output voltage of the generator 18. In that case, the circuit means 85 for limiting the error voltage applied to the magnetic amplifier would be unnecessary since the circuit means 50 would merely have to substantially balance the fixed ampere turns of the reference winding in order to prevent the regulator system from maintaining the output voltage of the associated generator when the output current reached a predetermined value.

It is also to be understood that the circuit means 85 for limiting the error voltage signal applied to the magnetic amplifier 100 may be applied in a regulator system without the circuit means 50 for preventing the regulator system 10 from maintaining the output voltage of the generator 18 at its regulated value when the output current of the generator 18 reaches a predetermined value if a constant inertia load is being driven by the motor 20 and there is no possibility of the motor 20 stalling. This application is possible because a constant inertia load would require a predetermined, substantially constant output current from the generator 18 to accelerate the load. The circuit means 85 therefore could be adjusted for an error voltage limit which would allow the generator 18 to supply the predetermined output current necessary to accelerate the constant inertia load.

The apparatus embodying the teachings of this invention has several advantages. For example, the circuit means 50 for preventing the regulator system 10 from raising the output voltage of the generator after the output current of the generator 18 reaches a predetermined value is responsive to output currents flowing in either direction and requires no source of external voltage. In addition, the circuit means 50 comprises only static components and thus requires a minimum of maintenance.

Since numerous changes may be made in the above-described apparatus and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, and fourth means connected in circuit relationship with said limit winding and said third means for preventing said magnetic amplifier from maintaining the output voltage of said generator at a predetermined value when said output current of said generator reaches a predetermined value.

2. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, and four means connected in circuit relationship with said limit winding and said third means for preventing said magnetic amplifier from maintaining the output voltage of said generator at a predetermined value when said output current of said generator reaches a predetermined value, said fourth means comprising a plurality of semiconductor devices.

3. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, and fourth means connected in circuit relationship with said limit winding and said third means for preventing said magnetic amplifier from maintaining the output voltage of said generator at a predetermined value when said output current of said generator reaches a predetermined value, said fourth means comprising a plurality of semiconductor diodes.

4. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier controlled in accordance with said error signal, said magnetic amplifier being connected to control the excitation current applied to said field winding so as to maintain said output voltage at a predetermined value, third means connected in circuit relationship between said output terminals and said magnetic amplifier for preventing said magnetic amplifier from maintaining said output voltage at a predetermined value when the output current of said generator reaches a predetermined value, and fourth means connected in circuit relationship between said second means and said magnetic amplifier for limiting the error signal applied to said magnetic amplifier to a predetermined value.

5. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, fourth means connected in circuit relationship with said limit winding and said third means for preventing said magnetic amplifier from maintaining the output voltage of said generator at a predetermined value when said output current of said generator reaches a predetermined value, and fifth means connected in circuit relationship between said second means and said control winding for limiting the error signal applied to said magnetic amplifier to a predetermined value.

6. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, fourth means connected in circuit relationship with said limit winding and said third means for preventing said magnetic amplifier from maintaining the output voltage of said generator at a predetermined value when said output current of said generator reaches a predetermined value, and fifth means connected in circuit relationship between said second means and said control winding for limiting the error signal applied to said magnetic amplifier to a predetermined value, said fifth means comprising a plurality of semiconductor devices.

7. In control apparatus for a generator having an excitation field winding and output terminals, the combination comprising first means for providing a reference voltage, second means for obtaining an error signal which is a measure of the difference between said reference voltage and the output voltage of said generator, a magnetic amplifier having a control winding, a limit winding and an output connected to control the excitation current applied to said excitation field winding so as to maintain said output voltage at a predetermined value, said control winding being connected to be responsive to said error signal, third means connected to said output terminals for obtaining a measure of the output current of said generator, fourth means connected in circuit relationship with said limit winding and said third means for preventing said magnetic amplifier from maintaining the output voltage of said generator at a predetermined value when said output current of said generator reaches a predetermined value, and fifth means connected in circuit relationship between said second means and said control winding for limiting the error signal applied to said magnetic amplifier to a predetermined value, said first means comprising a plurality of semiconductor diodes.

References Cited in the file of this patent
UNITED STATES PATENTS

| | | |
|---|---|---|
| Re. 19,807 | Gulliksen | Jan. 7, 1936 |
| 2,707,263 | Jorgenson | Apr. 26, 1955 |
| 2,719,259 | Miner | Sept. 27, 1955 |
| 2,785,361 | Schaelchin et al. | Mar. 12, 1957 |
| 2,809,301 | Short | Oct. 8, 1957 |
| 2,862,173 | Bobo et al. | Nov. 25, 1958 |